T. W. THOMSON.
BATTERY PLATE.
APPLICATION FILED NOV. 3, 1919.
1,385,507. Patented July 26, 1921.
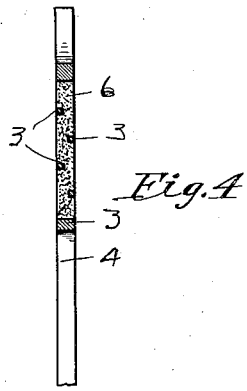
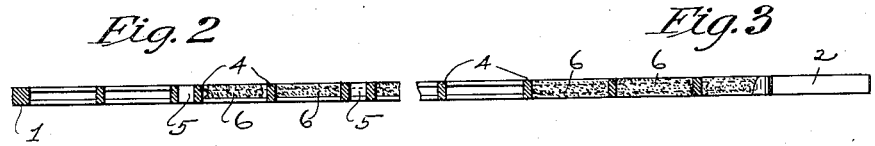
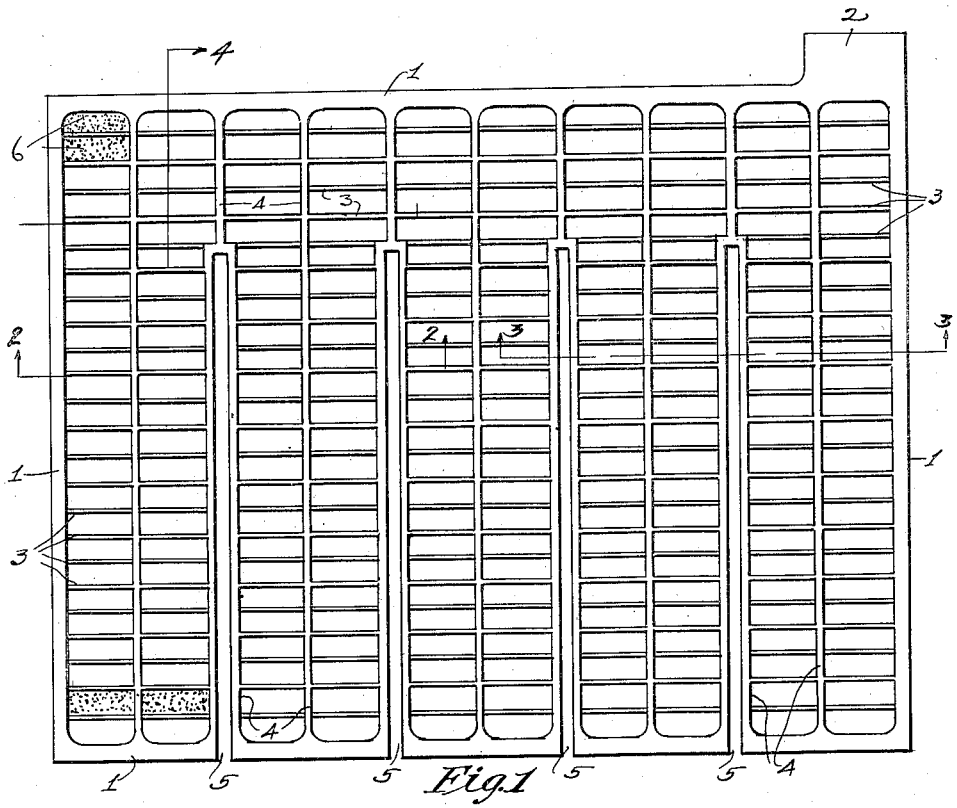
Thomas W. Thomson, Inventor.

UNITED STATES PATENT OFFICE.

THOMAS W. THOMSON, OF LOS ANGELES, CALIFORNIA.

BATTERY-PLATE.

1,385,507.

Specification of Letters Patent.  Patented July 26, 1921.

Application filed November 3, 1919. Serial No. 336,742.

*To all whom it may concern:*

Be it known that I, THOMAS W. THOMSON, a citizen of the United States, residing in the city of Los Angeles, county of Los Angeles, and State of California, have invented certain new and useful Improvements in Battery-Plates, of which the following is a specification.

My invention relates to battery plates, and more particularly to an improvement in grids for receiving and holding the active material used in such plates.

One of the principal difficulties with battery plates is their tendency, under expansion, to warp out of shape to such an extent as to interfere with the proper performance of their functions. Different attempts have been made to overcome this by providing slots in the plate within the margin thereof. This, however, has not avoided the difficulty.

I have discovered that by providing a grid with open slots or spaces which extend through the marginal frame and into the body of the plate a substantial distance, that expansion can take place without warping the plate sufficiently to interfere with the separator members placed between the battery plates.

In order to clearly explain my invention, I have illustrated one practical form thereof on the accompanying sheet of drawings, which I will now describe.

Figure 1 is a face view of a grid embodying my invention;

Fig. 2 is a cross sectional view thereof taken on line 2—2 of Fig. 1, with some of the spaces filled with the active material;

Fig. 3 is a similar cross sectional view on line 3—3 of Fig. 1; and

Fig. 4 is a similar fragmentary sectional view on line 4 of Fig. 1.

Referring now more in detail to the drawings, my grid as here illustrated comprises a marginal or border frame 1, with a terminal 2, said frame being provided with cross supporting bars 3, 3, and vertical bars 4, 4. Extending through the lower side marginal frame member 1, are four slots or spaces 5, which extend into the body of the grid a substantial distance, substantially as shown. This construction, it will be seen, provides five separated panels, with the spaces 5, therebetween, said panels merging at their upper ends into the upper portion of the grid body which is in width substantially the same as the width of a panel between the slots 5, 5. The live material is filled in the spaces between the supporting bars 3 and 4, in the usual manner.

By extending the slots 5, 5, through the metal border or frame members 1, sufficient space is provided to permit of the necessary expansion without causing the objectionable warping of the plate which so frequently destroys the usefulness of the battery.

I am aware that slight changes can be made in my invention as here shown without departing from the spirit thereof, and I do not, therefore, limit the invention to the exact showing here made, except as I may be limited by the hereto appended claim forming a part of this specification.

What I claim is:

A grid for a battery plate comprising a border frame with cross supporting bars spaced apart and connected at their ends to the border frame, vertical bars extending from the top to the bottom of said frame, the alternate vertical bars being of slotted form for the greater part of their lengths, said slot extending through the lower border frame member, whereby to form spaced panels composed of cross bars with side and middle vertical bars, substantially as shown in the drawings and described in the specification.

Signed at Los Angeles, county of Los Angeles, and State of California, this 3rd day of October, 1919.

THOMAS W. THOMSON.

In presence of—
 W. R. LITZENBERG,
 H. M. BRUNDAGE.